United States Patent Office 3,072,684
Patented Jan. 8, 1963

---

3,072,684
9α-HALO-Δ⁴-ANDROSTENE DERIVATIVES
Josef Fried, New Brunswick, N.J., assignor to Olin Mathieson Chemical Corporation, New York, N.Y., a corporation of Virginia
No Drawing. Filed Nov. 18, 1954, Ser. No. 469,848
5 Claims. (Cl. 260—397.3)

This application is a continuation-in-part of my application Serial No. 343,243, filed March 18, 1953, now abandoned.

This invention relates to the synthesis of valuable steroids, and more particularly to the synthesis of steroids of the androstane series.

One of the objects of this invention is the provision of an advantageous process of preparing a steroid of the androstane (including androstene and etiocholane) series having a 9α-halo substituent and an 11β-hydroxy (or 11-keto) substituent.

Another object of this invention is the provision of certain compounds useful in the preparation of known, physiologically active steroids and (in certain cases) also useful for their own physiological action.

The compounds of this invention comprise: (a) 9β,11β-oxido steroids of the androstane series; and (b) steroids of the androstane series having a 9α-halogen substituent and an 11β-hydroxy or 11-keto substituent.

The 9α-halo, 11β-hydroxy (or 11-keto) steroids of this invention can be obtained by a variety of processes employing either the corresponding 9β,11β-oxido steroids of the pregnane (including the pregnene and allopregnane) series or the corresponding 9α-halo, 11β-hydroxy (or 11-keto) steroids of the pregnane series as starting materials. These steroids of the pregnane series are then converted to the 9β,11β-oxido steroids of the androstane series or the 9α-halo, 11β-hydroxy (or 11-keto) steroids of the androstane series, respectively, by the process of this invention. The 9β,11β-oxido steroids of the androstane series can then be converted to the corresponding 9α-halo, 11β-hydroxy steroids. The latter may then be either dehalogenated to obtain the corresponding known 9-unsubstituted, 11β-hydroxy compounds, or oxidized to obtain the corresponding 9α-halo, 11-keto compounds. The 9α-halo, 11-keto steroids of the androstane series can also be dehalogenated to produce the known 9-unsubstituted, 11-keto compounds.

Among the compounds of this invention are those of the general formula:

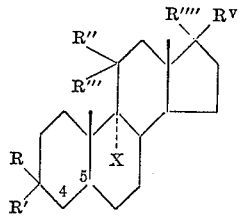

wherein the 4,5 position is double-bonded or saturated, and wherein individually R is hydrogen, R' is hydroxy or together R and R' is keto (oxo) or a ketal; individually R'' is hydrogen, R''' is β-hydroxy or together R'' and R''' is keto (oxo); individually R'''' is hydrogen or methyl, Rᵛ is hydroxy or together R'''' and Rᵛ is keto (oxo) or ketal, and X is an α-halogen group. The ketal substituents can be either open chain or cyclic ketal groups. Particularly preferred are those steroids wherein R and R', and R'''' and Rᵛ together are keto radicals.

Examples of 9α-halo, 11β-hydroxy steroids of the androstane series preparable by the processes of this invention include: 9α-iodo-Δ⁴-androstene-11β-ol-3,17-dione; 9α-bromo-Δ⁴-androstene-11β-ol-3,17-dione; 9α-chloro-Δ⁴-androstene-11β-ol-3,17-dione; 9α-fluoro-Δ⁴-androstene-11β-ol-3,17-dione; 9α-iodo-Δ⁴-androstene-11β,17β-diol-3-one; 9α-bromo-Δ⁴-androstene-11β,17β-diol-3-one; 9α-chloro-Δ⁴-androstene-11β,17β-diol-3-one; 9α-fluoro-Δ⁴-androstene-11β,17β-diol-3-one; 9α-iodo-17-methyl-Δ⁴-androstene-11β,17β-diol-3-one; 9α-bromo-17-methyl-Δ⁴-androstene-11β,17β-diol-3-one; 9α-chloro-17-methyl-Δ⁴-androstene-11β,17β-diol-3-one; 9α-fluoro-17-methyl-Δ⁴-androstene-11β,17β-diol-3-one; 9α-iodoandrostane-11β-ol-3,17-dione; 9α-bromo-androstane-11β-ol-3,17-dione; 9α-chloro-androstane-11β-ol-3,17-dione; 9α-fluoro-androstane-11β-ol-3,17-dione; 9α-iodo-etiocholane-11β-ol-3,17-dione; 9α-bromo-etiocholane-11β-ol-3,17-dione; 9α-chloro-etiocholane-11β-ol-3,17-dione; and 9α-fluoro-etiocholane-11β-ol-3,17-dione.

Examples of 9α-halo, 11-keto steroids of the androstane series preparable by the processes of this invention include: 9α-iodo-Δ⁴-androstene-3,11,17-trione; 9α-bromo-Δ⁴-androstene-3,11,17-trione; 9α-chloro-Δ⁴-androstene-3,11,17-trione; and 9α-fluoro-Δ⁴-androstene-3,11,17-trione.

The 9β,11β-oxido steroids of the pregnane series, utilizable in one of the processes of this invention, are prepared by the method disclosed in my applications, Serial No. 343,243 and Serial No. 417,489 (now U.S. Patent No. 2,852,511), filed March 18, 1953, and March 10, 1954, respectively, and an application of Fried and Herz, Serial No. 434,672 (now U. S. Patent No. 2,763,671), filed June 4, 1954. These 9β,11β-oxido steroids of the pregnane series are of the general formula

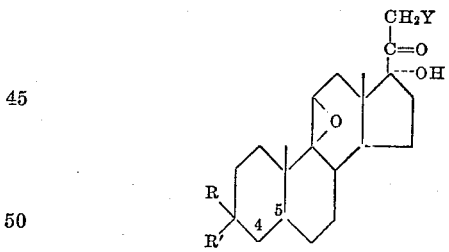

wherein the 4,5 position is double-bonded or saturated, and wherein R and R' are as above defined, and Y is hydrogen, hydroxy, or halo. Representative 9β,11β-oxido steroids include: 9β,11β-oxido-Δ⁴-pregnene-17α,21-diol-3,20-dione; 9β,11β-oxido-Δ⁴-pregnene-17α-ol-3,20-dione; 21-halo (e.g. chloro) - 9β,11β-oxido-Δ⁴-pregnene-17α-ol-3,20-dione; 9β,11β-oxido-pregnane-17α,21-diol-3,20-dione; 9β,11β-oxido-pregnane-21-ol-3,20-dione; 9β,11β-oxido-pregnane-17α-ol-3,20-dione; and 9β,11β-oxido-allopregnane-17α,21-diol-3,20-dione.

The conversion of the 9β,11β-oxido steroids of the pregnane series into the corresponding 9β,11β-oxido steroids

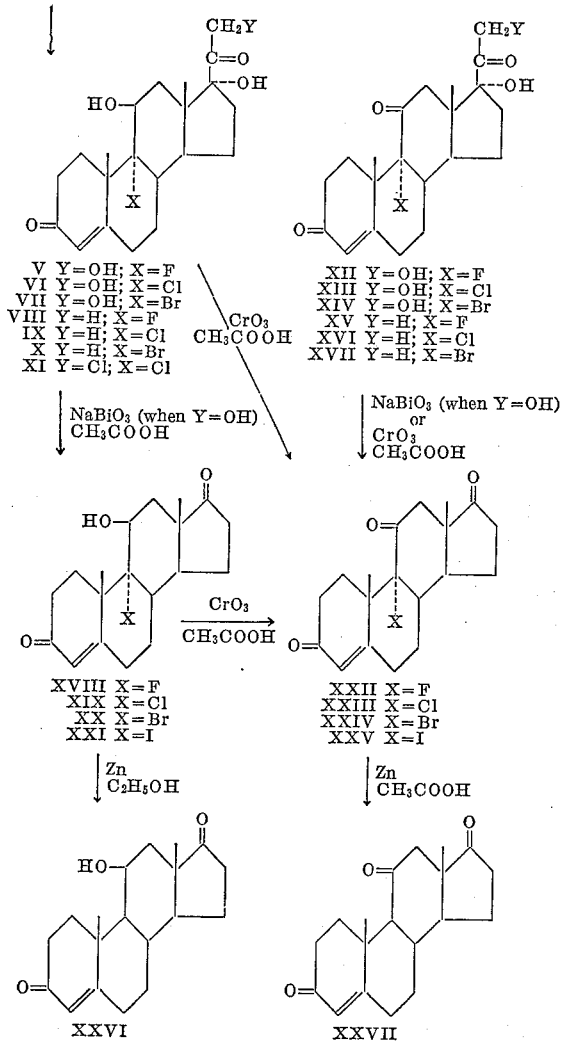

V Y=OH; X=F
VI Y=OH; X=Cl
VII Y=OH; X=Br
VIII Y=H; X=F
IX Y=H; X=Cl
X Y=H; X=Br
XI Y=Cl; X=Cl

XII Y=OH; X=F
XIII Y=OH; X=Cl
XIV Y=OH; X=Br
XV Y=H; X=F
XVI Y=H; X=Cl
XVII Y=H; X=Br

XVIII X=F
XIX X=Cl
XX X=Br
XXI X=I

XXII X=F
XXIII X=Cl
XXIV X=Br
XXV X=I

XXVI

XXVII

The following examples are illustrative of the invention (all temperatures being in centigrade):

EXAMPLE 1

9β,11β-Oxido-Δ⁴-Androstene-3,17-Dione (IV) From 9β,11β-Oxido-Δ⁴-Pregnene-17α,21-Diol-3,20-Dione (I)

To a solution of 9β,11β-oxido-Δ⁴-pregnene-17α,21-diol-3,20-dione (190 mg.) in 10 ml. of glacial acetic acid is added portionwise a solution of 190 mg. of chromic acid in 16.5 ml. of glacial acetic acid. After one hour at room temperature 1 ml. of alcohol is added and after an additional 10 minutes, the solution is evaporated to near-dryness. The residue is distributed between 5 ml. water and 20 ml. chloroform, and the resulting chloroform solution extracted with water, dilute sodium bicarbonate and again with water. After drying over sodium sulfate, the chloroform is removed in vacuo and the chloroform residue is crystallized from acetone-hexane affording 9β,11β-oxido-Δ⁴-androstene-3,17 dione having the following properties: M.P. about 180–181° C.; $[\alpha]_D^{23}+48°$ (c., 0.77 in chloroform);

$\lambda_{max}^{alc.}$ 242mμ ($\epsilon$=15,200); $\lambda_{max}^{Nujol}$ 5.79μ, 6.02μ, 6.06μ, 6.20μ

Analysis.—Calculated for $C_{19}H_{24}O_3$ (300.38): C, 75.97; H, 8.05. Found: C, 75.71; H, 8.31.

In a similar manner, by substituting 9β,11β-oxido-Δ⁴-pregnene-17α-ol-3,20-dione (II) or 9β,11β-oxido-Δ⁴-pregnene-21-chloro-17α-ol-3,20-dione (III) for 9β,11β-oxido-Δ⁴-pregnene-17α,21-diol-3,20-dione in Example 1, 9β,11β-oxido-Δ⁴-androstene-3,17-dione is also produced.

9β,11β-oxido-Δ⁴-androstene-3,17-dione can also be produced from Compound I by oxidizing the latter with sodium bismuthate rather than chromic oxide as illustrated by the following example:

EXAMPLE 2

To a solution of 300 mg. of 9β,11β-oxido-Δ⁴-pregnene-3,20 dione-17α,21-diol in 25 ml. of glacial acetic acid and 25 ml. of water is added 2.2 g. of sodium bismuthate and the suspension is shaken vigorously in the dark for 40 minutes at room temperature. The mixture is filtered and the residue on the filter washed thoroughly with 40 ml. of chloroform. The layers are separated and the aqueous phase washed with three additional 40 ml. portions of chloroform. The combined chloroform extracts are washed with water, bicarbonate solution and again with water, and dried over sodium sulfate. Evaporation of the solvent in vacuo leaves a residue (about 200 mg.) which is recrystallized from acetone-hexane. The pure epoxide is identical in all respects with the product obtained in Example 1.

9β,11β-oxido-Δ⁴-androstene-3,17-dione can then be converted to a 9α-halo,11β-hydroxy-Δ⁴-androstene-3,17-dione by reacting the former with a hydrogen halide as illustrated by the following examples:

EXAMPLE 3

9α-Chloro-Δ⁴-Androstene-11β-Ol-3,17-Dione (XIX) From 9β,11β-Oxido-Δ⁴-Androstene-3,17-Dione (IV)

To an ice-cold solution of 25.4 mg. of 9β,11β-oxido-Δ⁴-androstene-3,17-dione in 2.5 ml. of chloroform is added 0.5 ml. of 0.5 N hydrochloric acid in chloroform. After 1 hour at 0° C., more chloroform is added and the solution is extracted with sodium bicarbonate solution and water and finally dried over sodium sulfate. Evaporation of the solvent leaves a residue (about 29 mg.) which crystallizes readily from alcohol. Two further crystallizations from alcohol yield pure 9α-chloro-Δ⁴-androstene-11β-ol-3,17-dione having the following properties: M.P. 242° C. (dec.); $[\alpha]_D^{23}+190°$ (c. 0.73 in chloroform).

Analysis.—Calcd. for $C_{19}H_{25}O_3Cl$ (336.8): C, 67.75; H, 7.48; Cl, 10.50. Found: C, 67.59; H, 7.35; Cl, 10.65.

EXAMPLE 4

9α-Fluoro-Δ⁴-Androstene-11β-Ol-3,17-Dione (XVIII) From 9β,11β-Oxido-Δ⁴-Androstene-3,17-Dione (IV)

To a solution of 2.398 grams of 9β,11β-oxido-Δ⁴-androstene-3,17-dione in 95 ml. of chloroform and 5 ml. of absolute alcohol contained in a polyethylene bottle imbedded in an ice-bath is added with the exclusion of moisture anhydrous hydrogen fluoride until the solution assumes a bright cherry-red color. During the addition of the hydrogen fluoride and during the subsequent reaction period of 2¾ hours the solution is agitated with a magnetic stirrer. The mixture is then neutralized by the addition of a sodium bicarbonate suspension in water and the layers are separated. The coloroform solution is washed with water, dried over sodium sulfate and evaporated to dryness in vacuo. The residue crystallizes readily from 95% alcohol and affords 9α-fluoro-Δ⁴-androstene-11β-ol-3,17-dione which melts at about 269–270°; $[\alpha]_D^{23}+181°$ (c., 0.5 in 95% ethanol);

$\lambda_{max}^{alc.}$ 238 mμ ($\epsilon$=16,600); $\lambda_{max}^{Nujol}$ 3.03μ (OH), 5.75μ (17-CO), 6.10μ (Δ⁴-3-ketone)

Analysis.—Calcd. for $C_{19}H_{25}O_3F$: C, 71.24; H, 7.87. Found: C, 71.34; H, 7.72.

EXAMPLE 5

9α-Bromo-Δ⁴-Androstene-11β-Ol-3,17-Dione (XX) From 9β,11β-Oxido-Δ⁴-Androstene-3,17-Dione (IV)

To a solution of 25.1 mg. of 9β,11β-oxido-Δ⁴-androstene-3,17-dione in 0.5 ml. of glacial acetic acid and 0.5 ml. of carbon tetrachloride is added at room temperature 0.04 ml. of 30% hydrobromic acid in glacial acetic acid. After 10 minutes, 10 ml. of chloroform is added, and the mixture is extracted with dilute sodium bicarbonate and with water. The chloroform solution is dried over sodium sulfate, evaporated to dryness in vacuo and the residue of 9α-bromo-Δ⁴-androstene-11β-ol-3,17-dione is crystallized from acetone.

In a similar manner by substituting hydroiodic acid for the hydrochloric acid of Example 3 or the hydrobromic acid of Example 5, 9α-iodo-Δ⁴-androstene-11β-ol-3,17-dione (XXI) is formed.

The 9α-halo-11β-hydroxy androstane derivatives can also be produced directly by oxidizing the corresponding 9α-halo, 11β,21-dihydroxy pregnane derivatives with sodium bismuthate, as illustrated by the following example:

EXAMPLE 6

*9α-Fluoro-Δ⁴-Androstene-11β-Ol-3,17-Dione (XVIII) From 9α-Fluoro-Hydrocortisone (V)*

300 mg. of 9α-fluorohydrocortisone is oxidized with sodium bismuthate as described above in Example 2 for the 9β,11β-epoxide. The chloroform residue crystallizes spontaneously and recrystallized from 95% alcohol, yielding pure 9α-fluoro-Δ⁴-androstene-11β-ol-3,17-dione, identical to the compound produced in Example 4.

If 9α-chlorohydrocortisone (VI) or 9α-bromohydrocortisone (VII) is substituted for 9α-fluorohydrocortisone in Example 6, 9α-chloro-Δ⁴-androstene-11β-ol-3,17-dione (XIX) and 9α-bromo-Δ⁴-androstene-11β-ol-3,17-dione (XX) are produced, respectively.

The 9α-halo-Δ⁴-androstene-11β-ol-3,17-diones prepared by the methods of Examples 3, 4, 5, and 6 can be oxidized to the corresponding 9α-halo-Δ⁴-androstene-3,11,17-triones as illustrated by the following example.

EXAMPLE 7

*9α-Fluoro-Δ⁴-Androstene-3,11,17-Trione (XXII) From 9α-Fluoro-Δ⁴-Androstene-11β-Ol-3,17-Dione (XVIII)*

15.5 mg. of 9α-fluoro-Δ⁴-androstene-11β-ol-3,17-dione is oxidized with 6.5 mg. of chromic acid as described in Example 1. The residue from the chloroform extract upon crystallization from 95% ethanol furnishes pure 9α-fluoro-Δ⁴-androstene-3,11,17-trione, M.P. about 184–185°, $[\alpha]_D^{23}$+225° (c., 0.81 in chloroform);

$\lambda_{max}^{alc.}$ 234 mμ (ϵ=17 000); $\lambda_{max}^{Nujol}$ 5.74μ (17–CO), 58.0μ (11–CO), 5.96μ 6.19μ (Δ⁴-3-ketone)

*Analysis.*—Calcd. for $C_{19}H_{23}O_3F$: C, 71.66; H, 7.28. Found: C, 71.45; H, 7.40.

EXAMPLE 8

*9α-Bromo-Δ⁴-Androstene-3,11,17-Trione (XXIV) From 9α-Bromo-Δ⁴-Androstene-11β-Ol-3,17-Dione (XX)*

16.0 mg. of 9α-bromo-Δ⁴-androstene-11β-ol-3,17-dione is oxidized with 6.8 mg. of chromic acid as described in Example 1. The residue from the chloroform extract upon crystallization from 95% ethanol furnishes pure 9α-bromo-Δ⁴-androstene-3,11,17-trione.

By substituting 9α-chloro-Δ⁴-androstene-11β-ol-3,17-dione (XIX) or 9α-iodo-Δ⁴-androstene-11β-ol-3,17-dione (XXI) for 9α-fluoro-Δ⁴-androstene-11β-ol-3,17-dione in Example 7, or for 9α-bromo-Δ⁴-androstene-11β-ol-3,17-dione in Example 8, 9α-chloro-Δ⁴-androstene-3,11,17-trione (XXIII), and 9α-iodo-Δ⁴-androstene-3,11,17-trione (XXV) are produced, respectively.

The 9α-halo-Δ⁴-androstene-3,11,17-triones can also be prepared directly by the chromic acid oxidation of 9α-halo 11β-hydroxy (or 11-keto) steroids of the pregnane series such as 9α-fluorohydrocortisone (V), 9α-fluoro-11β,17α-dihydroxyprogesterone (VIII), 9α,21-dichloro-11β,17α-dihydroxyprogesterone (XI), 9α-chloro-11β,17α-dihydroxyprogesterone (IX), 9α-chlorocortisone (XIII), 9α-bromo-11β,17α-dihydroxyprogesterone (X), 9α-bromocortisone (XIV), 9α-fluoro-17α-hydroxy-11-ketoprogesterone (XV), 9α-chloro-17α-hydroxy-11-ketoprogesterone (XVI), and 9α-bromo-17α-hydroxy-11-ketoprogesterone (XVII), as illustrated by the following example using 9α-fluorocortisone (XII).

EXAMPLE 9

*9α-Fluoro-Δ⁴-Androstene-3,11,17-Trione (XXII) From 9α-Fluoro-Cortisone (XII)*

20 mg. of 9α-fluorocortisone is oxidized with 7 mg. of chromic acid as described in Example 1. The residue from the chloroform extract upon crystallization from 95% ethanol furnishes pure 9α-fluoro-Δ⁴-androstene-3,11,17-trione, identical with the compound produced in Example 6.

The 9α-halo,11β-hydroxy androstanes of this invention may be dehalogenated to the 9-unsubstituted,11β-hydroxy androstane derivatives by treatment of the former with zinc dust in alcohol, as illustrated by the following example.

EXAMPLE 10

*Δ⁴-Androstene-11β-Ol-3,17-Dione (XXVI) From 9α-Bromo-Δ⁴-Androstene-11β-Ol-3,17-Dione (XX)*

A solution of 100 mg. of 9α-bromo-Δ⁴-androstene-11β-ol-3,17-dione in 20 ml. of alcohol and 3 ml. of water is shaken with 1.0 g. of zinc dust at room temperature for 18 hours. The zinc dust is then removed by centrifugation and washed with alcohol. The alcoholic solution is concentrated in vacuo until most of the alcohol has evaporated and the remaining aqueous suspension is extracted with chloroform. The chloroform extract is dried over sodium sulfate and evaporated to dryness in vacuo. The residue is dissolved in 1 ml. of chloroform and 4 ml. of benzene and chromatographed on 2 g. of silicagel. Elution of the column with chloroform-benzene (1:1) yields Δ⁴-androstene-11β-ol-3,17-dione, which is identified by infrared comparison and mixed melting point with an authentic sample.

Similarly, 9α-iodo-Δ⁴-androstene - 11β - ol-3,17-dione (XXI) can be dehalogenated to Δ⁴-androstene-11β-ol-3,17-dione by the method of Example 10.

The 9α-halo,11-keto androstanes of this invention can be dehalogenated to the 9-unsubstituted, 11-keto androstane derivatives by treatment of the former with zinc dust in glacial acetic acid or chromous chloride as illustrated by the following example.

EXAMPLE 11

*Andrenosterone (XXVII) From 9α-Bromo-Δ⁴-Androstene-3,11,17-Trione (XXIV)*

To a solution of 10 mg. of 9α-bromo-Δ⁴-androstene-3,11,17-trione in 2 ml. of glacial acetic acid is added at steam bath temperature a total of 45 mg. of zinc dust. Additions are made portion-wise and the reaction is interrupted after 15 minutes. The residual zinc is removed by centrifugation, and the acetic acid solution is evaporated to dryness in vacuo. The residue is taken up in 3 ml. of water and 15 ml. of chloroform. After separation of the resulting layers, the chloroform solution is washed with water, dilute sodium bicarbonate and again with water; and after drying over sodium sulfate the solution is evaporated to dryness. The residue after two crystallizations from 95% alcohol, yields crystals, M.P. 222–224° C., which do not depress the melting point of authentic andrenosterone. Furthermore, the infrared spectrum of this produce is identical with that of andrenosterone.

Following the procedure of Example 11, 9α-iodo-Δ⁴-androstene-3,11,17-trione (XXV) can also be converted to andrenosterone.

The 9α-halo-Δ⁴-androstene-11β-ol-3,17-diones of this invention can also be prepared by starting with the known steroid Δ⁴,9(11)-androstadiene-3,17-dione [Bernstein et al., Journal of the American Chemical Society, volume 75, page 4830 (1953)]. This diene is reacted with an N-bromo-amide (including imide) of a carboxylic acid, e.g. N-bromoacetamide (or N-bromo-amides of other lower fatty acids), N-bromosuccinimide, and dibromodimethylhydantoin, or an N-chloro-amide (including imide) of a carboxylic acid, e.g. N-chloroacetamide (or N-chloroamides of other lower fatty acids), N-chlorosuccinimide, and dichlorodimethylhydantoin) in an inert organic solvent (e.g. dioxane or tertiary butanol) containing water and a relatively strong acid (i.e. perchloric acid). By this process 9$\alpha$-bromo-$\Delta^4$-androstene-11$\beta$-ol-3,11-dione (XX) and 9$\alpha$-chloro-$\Delta^4$-androstene-11$\beta$-ol-3,17-dione (XIX) are formed, respectively.

The 9$\alpha$-chloro, 9$\alpha$-bromo and 9$\alpha$-iodo-11$\beta$-hydroxy steroids of the androstane series can be converted to the 9$\beta$,11$\beta$-oxido derivative by treatment of the former with a salt of a strong base and weak acid such as an alkali metal salt of a weak organic acid (e.g., potassium carbonate, potassium bicarbonate, or potassium acetate) in an organic solvent such as alcohol or acetone. Thus, 9$\alpha$-bromo-$\Delta^4$-androstene-11$\beta$-ol-3,17-dione (XX) and 9$\alpha$-iodo-$\Delta^4$-androstene-11$\beta$-ol-3,17-dione (XXI) can be reacted with potassium acetate in ethanol to form 9$\beta$,11$\beta$-oxido-$\Delta^4$-androstene-3,17-dione (IV).

$\Delta^{4,9(11)}$-androstadiene-3,17-dione is also useful as a starting material in the preparation of the 9$\alpha$-halo-$\Delta^4$-androstene-11$\beta$,17$\beta$-diol-3-ones, the 9$\alpha$-halo-17$\alpha$-methyl-$\Delta^4$-androstene-11$\beta$,17$\beta$-diol-3-ones, and the 9$\alpha$-halo-17$\alpha$-methyl-$\Delta^4$-androstene-17$\beta$-ol-3,11-diones of this invention. Thus, the $\Delta^{4,9(11)}$-androstadiene-3,17-dione is preferentially ketalized at the C$_3$-carbon by treatment with either a dihydric alcohol (e.g., ethylene glycol) or with an ethylene ketal of a lower ketone (such as acetone or methyl ethyl ketone) in the presence of a strong acid (e.g. p-toluenesulfonic acid). The 3-mono ketal formed (e.g. $\Delta^{5,9(11)}$-androstadiene-3,17-dione 3-ethylene ketal) can then be reacted with either lithium aluminum hydride to form $\Delta^{5,9(11)}$-androstadiene-17$\beta$-ol-3-one 3-ethylene ketal or with a Grignard reagent such as methyl magnesium bromide to form $\Delta^{5,9(11)}$-17$\alpha$-methyl-17$\beta$-ol-3-one 3-ethylene ketal. These intermediates can then be hydrolized, as by treating with 80% acetic acid to form $\Delta^{4,9(11)}$-androstadiene-17$\beta$-ol-3-one and 17$\alpha$-methyl-$\Delta^{4,9(11)}$-androstadiene-17$\beta$-ol-3-one, respectively. These dienes can then be converted to their respective 9$\alpha$-bromo (or 9$\alpha$-chloro)-11$\beta$-hydroxy derivatives by treatment with one of the N-bromo-amides or N-chloro-amides previously listed. These 9$\alpha$-halo-11$\beta$-hydroxy steroids can then be converted to their 9$\beta$,11$\beta$-oxido derivatives by treatment with potassium acetate; and the 9$\beta$,11$\beta$-oxido derivatives can then be hydrohalogenated by treatment with a hydrogen halide in accordance with the methods previously disclosed.

The invention may be variously otherwise embodied within the scope of the appended claims.

I claim:
1. 9$\alpha$-halo-$\Delta^4$-androstene-11$\beta$-ol-3,17-dione.
2. 9$\alpha$-halo-$\Delta^4$-androstene-3,11,17-trione.
3. 9$\alpha$-chloro-$\Delta^4$-androstene-11$\beta$-ol-3,17-dione.
4. 9$\alpha$-fluoro-$\Delta^4$-androstene-11$\beta$-ol-3,17dione.
5. 9$\alpha$-fluoro-$\Delta^4$-androstene-3,11,17-trione.

References Cited in the file of this patent

UNITED STATES PATENTS

| | | |
|---|---|---|
| 2,684,364 | Jones | July 20, 1954 |
| 2,686,181 | Julian | Aug. 10, 1954 |
| 2,691,029 | Hanze | Oct. 5, 1954 |
| 2,691,030 | Murray | Oct. 5, 1954 |
| 2,703,799 | Bergstrom | Mar. 8, 1955 |
| 2,707,190 | Farrar | Apr. 26, 1955 |

OTHER REFERENCES

Fieser et al: "Natural Products Related to Phenanthrene," 3rd edition, 1949, page 424.

Bernstein et al.: J. Am. Chem. Soc., vol. 75, pages 1480–1482, Mar. 20, 1953.